Jan. 16, 1962 G. C. ROWLEY 3,017,093

ELECTRICAL COUNTING

Filed June 25, 1959 2 Sheets-Sheet 1

Inventor
G. C. Rowley
By Glascock Downing & Seebold
Attys.

Inventor
G. C. Rowley
By Mason, Kolehmainen, Downing & Seebold
Attys.

3,017,093

ELECTRICAL COUNTING

Geoffrey Charles Rowley, Cheam, England, assignor to A. V. Roe & Co. Limited, Middleton, England
Filed June 25, 1959, Ser. No. 822,775
Claims priority, application Great Britain June 30, 1958
1 Claim. (Cl. 235—155)

This invention relates to the counting of electrical impulses representing incremental and decremental changes.

Co-pending application No. 801,027 describes a reversible binary counter which counts positively or negatively, depending upon the receipt of incremental pulses on one input or decremental pulses on a second input, and comprises an OR-gate to which similar pulses representing positive and negative increments are separately applied, coupled to a bi-stable multivibrator flip-flop circuit, the output of which is coupled on the one hand to a first two-gate circuit which passes a pulse when the flip-flop circuit reverts from a "1" state to a "0" state when a positive control line connected thereto is energised, and on the other hand to a second two-gate circuit which passes a pulse when the flip-flop circuit reverts from a "0" state to a "1" state when a negative control line connected thereto is energised, the connections between the OR-gate and the flip-flop circuits, and between the flip-flop circuit and the two two-gate circuits respectively being by way of differentiating circuits.

It is sometimes required to count modulo N where N is a number other than 2, and therefore the object of the present invention is to provide a counter for counting in a reversible manner for any value of N greater than 2.

The invention consists in a reversible binary counter comprising an OR-gate to which similar pulses representing positive and negative increments are separately provided, coupled to a bi-stable multivibrator flip-flop circuit, the output of which is coupled on the one hand to a first two-gate circuit which passes a pulse when the flip-flop circuit reverts from a "1" state to a "0" state when a positive control line connected thereto is energised, and on the other hand to a second two-gate circuit which passes a pulse when the flip-flop circuit reverts from a "0" state to a "1" state when a negative control line connected thereto is energised, the two outputs of the bi-stable multivibrator flip-flop circuit being connected to an end count detector which provides outputs at an upper and a lower count representation for the purpose of resetting the flip-flops, the count spacing between the count representations corresponding to the desired module.

Figure 1:
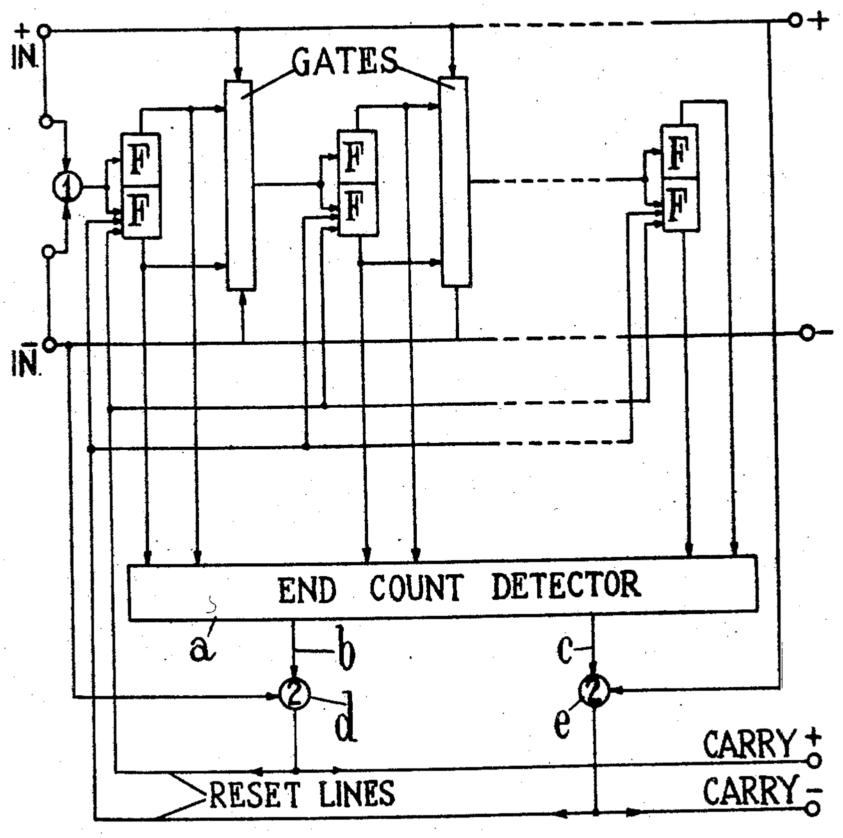
Figure 2:
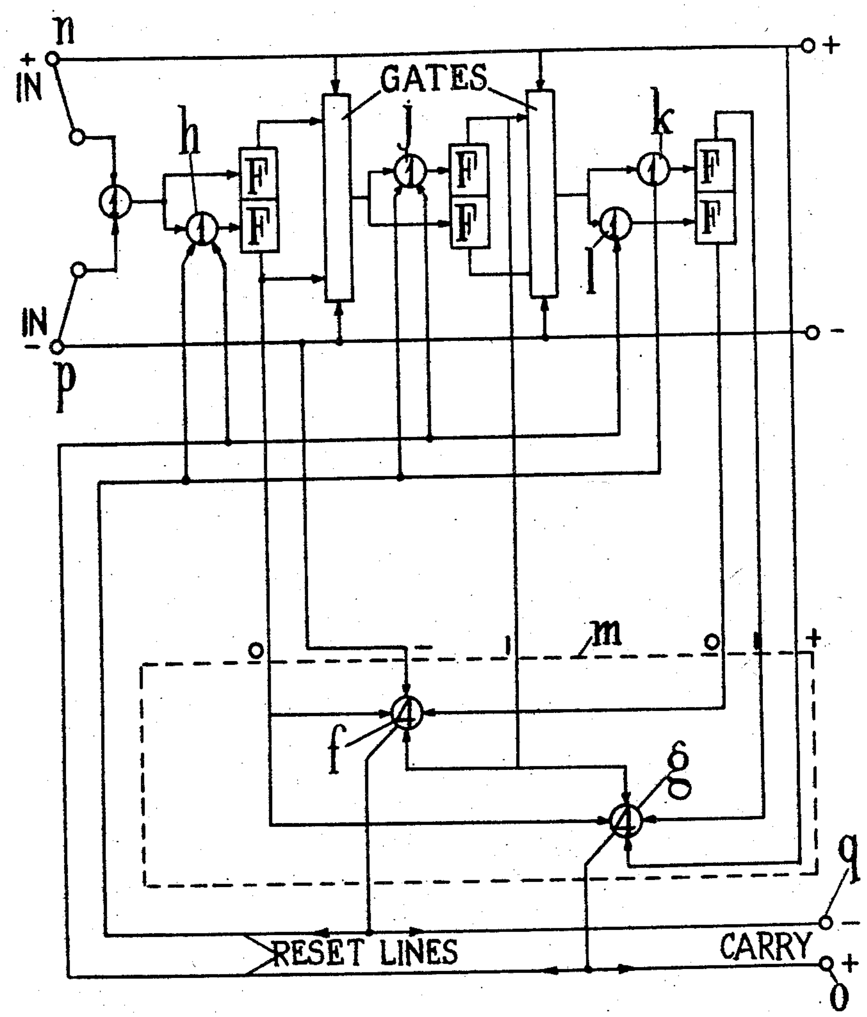

The accompanying drawings show diagrammatically by way of example only two embodiments of the invention in which:

FIGURE 1 is a circuit representation of a binary counter constructed in accordance with the invention, while FIGURE 2 shows a modification of the counter shown in FIGURE 1.

FIGURE 1 shows a block schematic diagram of a reversible binary counter for counting in accordance with the invention. In this arrangement the two outputs of each of the bi-stable multivibrator flip-flops FF are connected to an end counter detector *a*. A counter of this type which is required to count modulo N will require M counter stages where $2^M$ is the binary number just greater than N. For example, if it is required to count modulo 5, three counter stages are required, since $2^2=4$ and $2^3=8$. Two stages would, therefore, be insufficient, and three are necessary.

In general, therefore, there will be a choice of binary representations between which counting may take place. In the example quoted, counting may take place between the binary repersentation of 0 and the binary representation of 5, or between 1 and 6, and so on. The actual range chosen will depend upon the application for which the counter is required, or may be based upon the relative complexity of the circuits required for each of the possible ranges.

Two outputs *b* and *c* are available from the end count detector, one *b*, when the binary representation chosen for the lower limit of counting is detected, and the other, *c*, when the upper limit is detected. These outputs are taken to two two-gates *d* and *c*, whose second inputs are connected to the negative and positive inputs of the reversible binary counter respectively. Thus, when the lower count representation is detected, the next incoming decremental pulse causes an output from the two-gate *d*, and this output is used as an overflow indication from the counter, and is also fed to the individual bi-stable multi-vibrator flip-flops to set them to the states corresponding to the upper count. Similarly, when the upper count representation is detected, and an incremental pulse arrives on the positive input to the counter, an output is emitted from the two-gate *e*, and this is used to reset the bi-stable multivibrator flip-flops to the state corresponding to the lower count. The counter will, therefore, work between the lower count and upper count representations, and, when overflowing occurs, will be automatically reset to the correct representation to enable counting to proceed correctly.

Selecting, for example, the modulo 5, Table 1 shows the binary representations from which the range of five successive counts may be made:

*Table 1*

| Count: | Binary coding |
|---|---|
| 0 | 000 |
| 1 | 001 |
| 2 | 010 |
| 3 | 011 |
| 4 | 100 |
| 5 | 101 |
| 6 | 110 |
| 7 | 111 |

For the purposes of this example, the representations of 2 and 6 have been taken as the lower and upper end counts respectively, and FIGURE 2 shows the general arrangement. The four-gates *f* and *g* constitute the end count detector and also incorporate the two-gates *d* and *e* of FIGURE 1. When the count 110 is reached, the ensuing positive increment on the positive input line *n* opens the four-gate *g* to allow a pulse to reach the output *o* and also to reset the counter to the count 010 by means of the OR-gates *h*, *j* and *l*. Similarly, when the count 010 is reached, an ensuing pulse on the negative decrement line *p* causes the four-gate *f* to open, and a pulse to reach the carry output *q* and to reset the counter to the count 110 by means of the OR-gates *h*, *j* and *k*. Thus, the counter counts between 010 and 110 in a reversible manner, as required.

The invention allows a reduction in, as compared with previous arrangements the amount of equipment required and in the power consumed since transistors and solid state diodes may be used, both in the reversible binary counter and in the end count detector and associated gates.

It is to be understood that the above description is by way of example only and that details for carrying the invention into effect may be varied without departing from the scope of the invention.

I claim:

A reversible binary counter for counting modulo N where N is any number greater than 2, comprising a plurality of counter stages, each stage comprising an OR-gate having a first input to which impulses representing an increase in the count representation are applied, a second input to which impulses representing a decrease in the count representation are applied, and an output connected to the two trigger inputs of a bistable flip-flop circuit, a first output from the bistable flip-flop circuit connected to the first input of a first AND-gate, the second input of the first AND-gate being connected to a first input line to which are applied external impulses to cause a unit increase in the count representation, a second output from the bistable flip-flop circuit connected to the first input of a second two-input AND-gate, the second input of the said second AND-gate being connected to a second input line to which are applied external impulses to cause a unit decrease in the count representation, the output of the first AND-gate and the output of the second AND-gate being signals representing increases in the count representation for connection to the OR-gate in the succeeding counter stage, the first and second inputs to the OR-gate in the least significant stage being connected respectively to the first and second input lines, a pair of further AND-gates, the inputs of which comprise the first or second respective outputs from each of the flip-flops of each counter stage and the respective first and second input lines, and an output line connected to each of the further AND-gates for transmitting impulses upon detection of any preselected pair of lower and upper count representations, said output line being coupled to the counter for resetting it to the lower count representation when the upper count is reached and vice versa, the numerical difference between the upper and lower count representations being the required counting modulus.

References Cited in the file of this patent

UNITED STATES PATENTS

| | | |
|---|---|---|
| 2,538,122 | Potter | Jan. 16, 1951 |
| 2,539,623 | Heising | Jan. 30, 1951 |
| 2,880,934 | Bensky et al. | Apr. 7, 1959 |